51. ABF

50

51-50.R 26

Exar

51/50

Nov. 9, 1937.

C. T. RAULE

Re. 20,549

Orig. 1,997,978

TWO SLIDE AUTOMATIC GRINDING MACHINE

Original Filed Oct. 7, 1926 2 Sheets-Sheet 1

Witness:
Walter Chind.

Inventor
Clifford T. Raule.
by [illegible]
Attorney

Nov. 9, 1937. C. T. RAULE Re. 20,549
TWO SLIDE AUTOMATIC GRINDING MACHINE
Original Filed Oct. 7, 1926 2 Sheets-Sheet 2
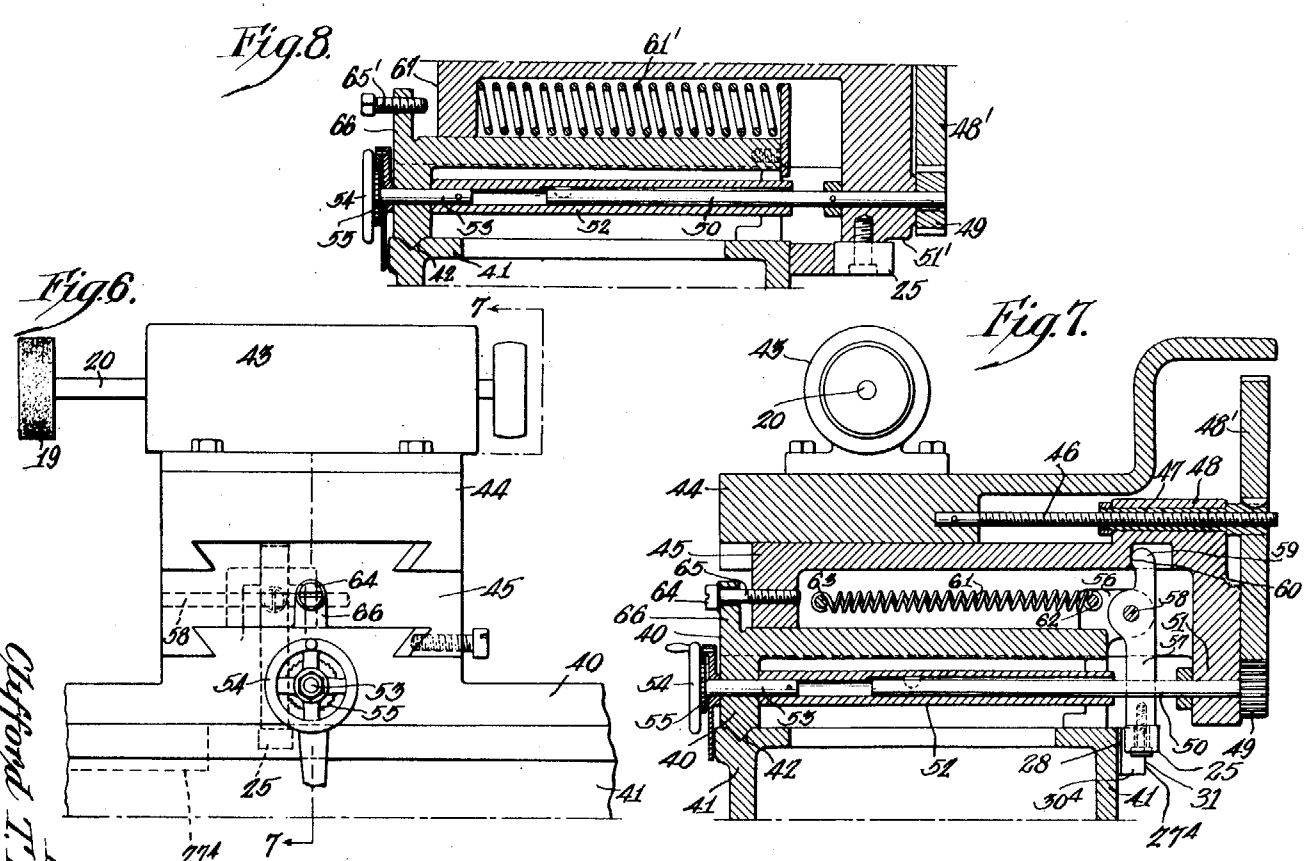
Witness:
Walter Chism
Inventor:
Clifford T. Raule.
by
Attorney.

T. ABRADING
50
Examiner

Reissued Nov. 9, 1937

Re. 20,549

UNITED STATES PATENT OFFICE 20,549

TWO SLIDE AUTOMATIC GRINDING MACHINE

Clifford T. Raule, Vista, Calif., assignor to The Heald Machine Company, Worcester, Mass., a corporation of Massachusetts Original No. 1,997,978, dated April 16, 1935, Serial No. 140,034, October 7, 1926. Application for reissue April 6, 1937, Serial No. 135,351

11 Claims. (Cl. 51—50)

My invention relates to automatic grinding machines with particular reference to machines adapted to grind a succession of duplicate bushings or sleeves interiorly to size.

A purpose of my invention is to bring the grinding wheel into contact with the work and out of contact with the work by radial movement, having moved the wheel longitudinally across a truing tool inward of the line of initial cut before onsetting, and moving the wheel longitudinally across a truing tool inward of the line of finished grinding after offsetting.

A further purpose is to diamond in a predetermined line along which the cutting surface of the wheel travels longitudinally when moving into and out of the work, said line being inward of the line of finished grinding.

A further purpose is to provide desirable automatic onsetting and offsetting mechanism for an internal grinder.

A further purpose is to provide an automatic grinding machine with a two-slide wheel carriage.

A further purpose is to offset a stationary diamond from the line of finished grinding for use in automatically gaging the work pieces to accurate size and in automatically truing up the grinding wheel between its grindings of successive pieces.

Further purposes will appear in the specification and in claims.

My invention relates to the methods involved as well as to the structure for carrying out these methods.

Of the many forms that my invention may take I have illustrated only a few, showing these chiefly in diagram, but have selected forms that illustrate particularly well the principles involved and that are adapted to effective and inexpensive operation.

Figures 1 to 3 are diagrammatic longitudinal elevations illustrating somewhat different ways of applying my invention.

Figures 4 and 5 are diagrammatic views illustrating another form, Figure 4 being a fragmentary side elevation as viewed from line 4—4, Figure 5, and Figure 5 being a fragmentary end elevation as viewed from line 5—5, Figure 4.

Figure 6 is a fragmentary front elevation of structure adapted to operate in accord with the diagram of Figure 1.

Figure 7 is a section taken upon the line 7—7 of Figure 6.

Figure 8 is a transverse section corresponding generally to a portion of Figure 7 but illustrating an embodiment of my invention shown in Figure 2.

Like numerals refer to like parts in all figures.

Figure 1:
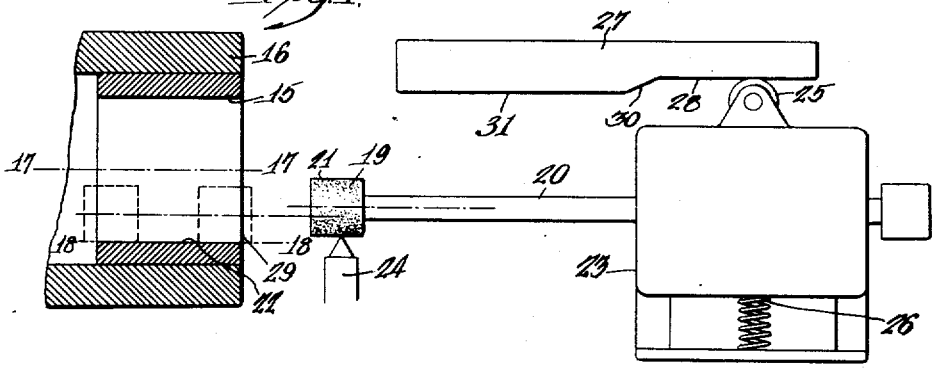

Describing in illustration and not in limitation and referring to the drawings:—

Hard bushings and sleeves change somewhat in size during hardening and are therefore finished to size after hardening by grinding, being too hard for machining.

My invention has particular reference to automatic machines for quantity production of duplicate hardened sleeves or bushings to exact interior size by grinding and aims to avoid bell-mouthing incident to an engagement between the extreme edges of a grinding wheel and the revolving sleeve being ground.

Figure 2:
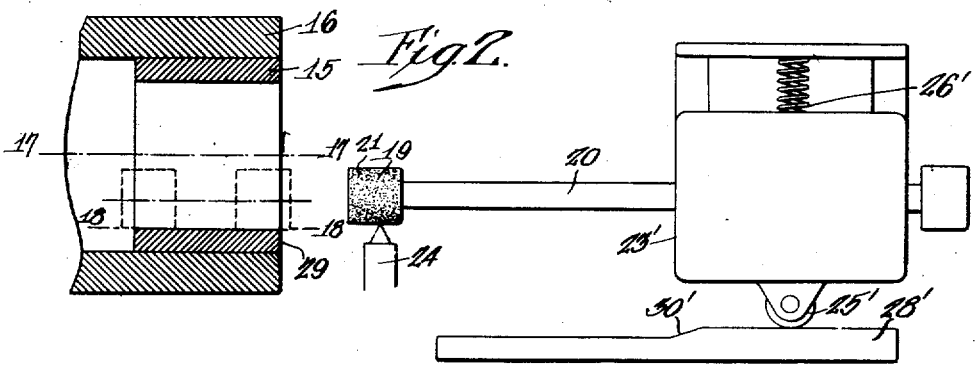
Figure 3:
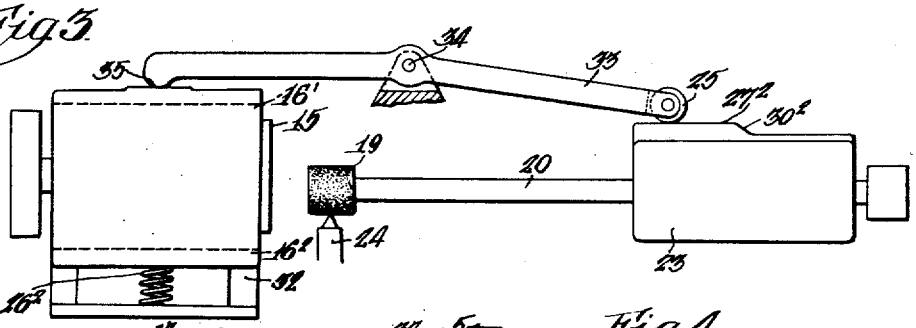

In the diagrammatic Figures 1–3, the work to be internally ground is shown as a cylindrical sleeve 15 held in a revolving workhead 16.

The dot and dash lines 17—17 and 18—18 are respectively the rotation axis of the sleeve and the desired line of finish to which the sleeve is to be internally ground.

A grinding wheel 19 mounted upon a spindle 20 revolving at high velocity has a grinding face 21 maintained parallel to the line 18—18 of finished grinding, and during grinding reciprocates longitudinally across the internal face 22 of the sleeve 15 by means of a reciprocating supporting carriage 23, the motion of the carriage during grinding being parallel to the line of finished grinding.

In the prior art a diamond has been set in the line of finished grinding somewhat in front of the sleeve for use in truing the wheel between the grinding of successive sleeves 15. The carriage has moved toward the diamond with the wheel projecting very slightly beyond the line of finished grinding and in passing the diamond the wheel has been trued up to the line of finished grinding, the motion of the carriage being parallel to this line.

The wheel with its circumference in the line of finished grinding has then moved slowly into the revolving sleeve and has automatically reciprocated from end to end of the sleeve, each time overlapping somewhat.

After a succession of such back and forth movements the wheel has moved back out of the way for removal of the finished sleeve and the insertion of a new one and on the way out has again passed across the truing diamond by virtue of a small transverse feed operating when the wheel has moved clear of the work to increase its distance from the axis of the workhead.

The operation then repeats, the carriage moving forward, the grinding wheel passing across the point of the diamond and entering the next unground sleeve.

The operation thus described as part of the prior art is well adapted to quantity production but unfortunately has a disadvantage incident to the initial and final engagements between the extreme edges of the wheel and sleeve and because of these engagements there has been produced what is called bell-mouthing at the edge of the sleeve.

There is always a certain amount of bending of the wheel spindle due to the pressure of the grinding wheel against the work. Where the wheel is in contact with the piece at the edge all of the force exerted by the wheel against the surface will be concentrated on a small area, and the wheel will have a tendency to "dig in" or make an abnormally deep cut. This will produce a condition known as "bell-mouthing". "Bell-mouthing" may take place either when the wheel is fed into the work by moving the wheel axially in the line of initial grinding, or when the wheel is withdrawn from the work by moving it axially in the line of finish grinding.

My invention avoids this bell-mouthing by automatically bringing the wheel some distance into the sleeve before having it make grinding engagement with the sleeve and likewise moving it toward the sleeve axis before removing from the sleeve.

I set the point of the truing diamond 24 inwardly from the line of finished grinding and in moving the carriage 23 longitudinally forward true-up the wheel, by passing it over the diamond, to a line that is some distance inwardly from the line of finished grinding. After passing over the diamond the wheel moves some distance into the sleeve before engaging the sleeve.

When the wheel has advanced some distance into the sleeve onsetting movement between the sleeve and the wheel brings the wheel to its proper position for grinding, and it may now move as in the prior art longitudinally back and forth from overlapping one end of the sleeve to somewhat overlapping the other, repeating any desired number of times, the sleeve revolving at any desirable speed.

After finishing the grinding of any sleeve the wheel and sleeve are offset in a direction radial to the sleeve and the carriage automatically moves rearwardly, the wheel being preferably fed a very small distance radially outwardly from the axis of workhead for another truing cut by the diamond on the way rearward.

While back out of the way the finished sleeve is removed from the workhead and another put in after which the operation is repeated, the carriage moving longitudinally inwardly, the wheel again passing across the truing diamond and some distance into the next sleeve without engaging the sleeve and then stepping over in a direction radial to the sleeve into engagement with the sleeve by a relative onsetting movement between the wheel and workhead.

Obviously the means for providing automatic relative onsetting movement between the wheel and workhead after the wheel has entered the work is subject to wide variation without departing from the broad invention and the diagrammatic Figures 1–4 illustrate a few of many ways for accomplishing this relative onsetting.

In the diagram of Figure 1 the carriage 23 upon one side carries a roller 25 and upon the other side is resiliently pressed at 26 so that its roller 25 maintains engagement with a cam or track 27.

As the carriage moves inwardly the roller first runs along a rearward portion 28 of the cam or track 27 and before the end of this rearward portion has been passed, the face of the wheel is trued by passing across the diamond. After the wheel has passed the diamond and after the end of the wheel is well inside the forward edge 29 of the sleeve 15, the roller 25 engages the effective portion 30 of the cam and the carriage is pushed outwardly against the action of the spring 26 to bring the wheel into position for grinding.

The carriage may now move automatically back and forth with the roller on the straight portion 31 of the cam, bringing the wheel to a position somewhat overlapping first one end and then the other of the sleeve and repeating until the grinding operation is completed and then moving rearwardly.

As soon as the wheel in moving rearwardly reaches the position at which it first moved into engagement with the sleeve it moves inwardly by reason of the roller 25 on the carriage again moving over the onsetting and offsetting portion 30 of the cam.

In Figure 1 the onsetting engagement between the grinding wheel and sleeve is attained by positive shifting of the line of longitudinal travel of the wheel when the roller 25 passes the offset portion 30 of the cam. The cam forces the carriage over positively (except for slight yielding of the spindle 20) against the action of the spring at 26. What may be called the reverse arrangement is illustrated in Figure 2, where the resilient pressure at 26' effects onsetting and offsetting and the direction of positive shifting of the line of travel by the cam is away from engagement.

In Figure 2, the roller 25' travels on the rearward portion 28' of the cam track until the wheel has been trued on the diamond and has entered some distance into the sleeve when the roller passes the offset 30' which permits the spring 26' to push the carriage over into its line of travel for grinding.

Figure 4:
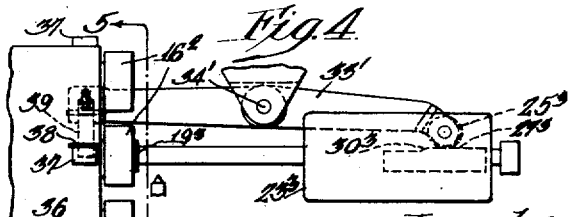

The onsetting or offsetting motion between the grinding wheel and the sleeve may be due to a corresponding motion of the workhead rather than of the wheel and this is illustrated in diagram in Figures 3 and 4.

In Figure 3 the workhead 16' turns in a bearing 16² that is mounted upon a slide 32 and is laterally shifted by moving the bearing on the slide against the force of a spring 26² when the wheel enters somewhat into the sleeve.

In Fig. 3, the carriage, again designated by the numeral 23, has a cam 27² that shifts the angular position of a rocker arm 33 to effect the onsetting or offsetting motion of the bearing and therefore of the revolving workhead 16' turning in the bearing.

The rocker arm, turning upon a fixed pivot 34, carries at one end a roller 25 rolling on the cam and at the other end presents a toe 35 against the side of the bearing, stopping the bearing from yielding to the force of the spring.

The carriage 23 moves forward until the wheel 19 after having passed across the truing diamond 24 has entered somewhat into the sleeve 15 when the offset 30² on the cam track 27² carried by the carriage reaches the roller 25 permitting yielding of the rocker arm and shifting the bearing under the force of the spring 26².

This produces the needed onsetting motion of the carriage to bring proper engagement between the grinding wheel and the sleeve.

After this engagement has taken place there may be the usual automatic movement of the grinding wheel back and forth from a position somewhat overlapping one end of the sleeve to a position somewhat overlapping the other, repeating any desired number of times and then withdrawing. The setting motion reverses before the wheel leaves the sleeve to relieve from grinding during withdrawal and the wheel desirably passes over the truing diamond on its way rearward as already described.

Figure 5:
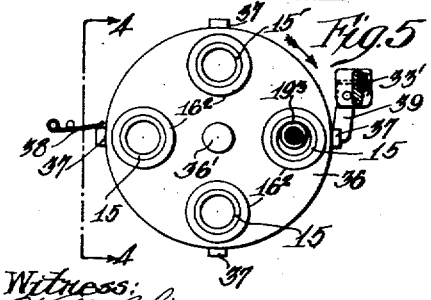

The workhead may be given the desired movement in other ways than by mounting it upon a slide and I illustrate this in the diagrammatic Figures 4 and 5.

In these figures, the numerals 16², 16² are used to designate a plurality of revolving workheads, four in number and shown here mounted upon a turret 36, being uniformly spaced around the turret at the same radial distance from the turret axis. The turret rotates with an intermittent angular movement around a fixed pivot 36'.

A wheel 19³ grinds the interior of the revolving work pieces or sleeves 15 at one of the positions of dwell of the turret, grinding a sleeve during each period of rest and being withdrawn while the turret is offsetting.

In each rest period the turret presents the sleeve initially in a position offset from the path of the wheel permitting the wheel to enter the sleeve out of contact therewith and onsets to grinding contact with the wheel after the wheel has entered some distance into the sleeve.

When the wheel has completed its grinding operation and starts toward withdrawal the turret is again given a slight offsetting movement and during withdrawal the wheel is again out of engagement with the sleeve.

The turret may be operated by any suitable intermittent gearing, not shown, having some lost motion and makes a succession of quarter turns in the direction of the arrow with intermediate rest periods for the internal grinding of the revolving sleeve presented to the grinding wheel.

During each rest period there is sufficient lost motion in the gearing to permit a small range of setting to different angular positions, and the diagrams of Figures 4 and 5 illustrate an automatic small change in the angular position of the turret during each rest period, to take place when the grinding wheel 19³ has entered a sufficient distance into the sleeve 15 held by one of the workheads 16².

When approaching any position of rest, one of four lugs 37 that are spaced upon the turret circumferentially 90° apart, engages a spring 38, strongly deflecting this spring by the time the position of rest is reached, so that during each period of rest the turret is resiliently pressed toward rearward turning.

At the beginning of the rest period the turret is angularly in position for the wheel 19³ to enter the sleeve 15 without their engaging, but after sufficient entry to avoid bell-mouthing, the turret is advanced a very small distance against the resilient pressure of the spring 38 to the proper position for grinding.

This small advancement into position for grinding is within the range of lost motion of the gearing and may be effected by a pawl 39 transversely pivoted on the end of a rocker lever 33' operated by the longitudinal insertion and withdrawal of the wheel into and from the sleeve. The rocker lever turns on a fixed pivot 34' and angularly deflects the turret in the direction of the arrow when a roller 25³ upon the outer end of the rocker lever reaches the offset 30³ on a suitable cam 27³ on the reciprocating carriage 23³.

The pawl 39 is shown engaging one of the lugs 37 and in position to advance the turret into grinding position.

While the specific structure for performing the onsetting and offsetting movement between the wheel and sleeve may be widely varied as already explained and while my invention in its broad application includes this relative onsetting and offsetting after the wheel has entered the work in whatever way it is obtained, I show in Figures 6–8 a two-transverse slide carriage that is particularly well adapted to the performance of my method, claiming the specific structure shown in these figures.

Figures 6 and 7 illustrate a two-slide carriage that embodies the diagrammatic arrangement shown in Figure 1 while in Figure 8 the two-slide carriage is modified to give the arrangement illustrated in diagram in Figure 2.

The carriage proper 40 is adapted to longitudinal motion along a stationary bed 41, a V projection 42 along the front of the carriage fitting in a guideway of V-runway of the stationary bed.

The revolving spindle 20 mounted in suitable bearings 43 is carried by an upper transverse slide 44 that is supported by a lower transverse slide 45 between the carriage 40 and the upper slide.

The upper slide is laterally adjustable with a respect to the lower slide and the lower slide is controlled in lateral position by engagement between the roller 25 and a stationary cam 27⁴ carried upon the bed or in effect by the forward position of the wheel 19 along its longitudinal range of travel. When the grinding wheel has been advanced to a point somewhat inside the sleeve 15 the roller 25 engages an onsetting or offsetting portion 30⁴ upon the cam and the lower slide 45 moves over carrying the wheel to engagement with the sleeve.

Lateral adjustment of the upper slide with respect to the lower slide is desirably effected by means of a screw 46 carried by the upper slide and shown rigidly fastened to the upper slide, threading through a sleeve 47 which turns within a bearing 48 carried upon the lower slide and has at its outer end a gear 48' meshing with a corresponding gear 49 upon a shaft 50, having bearings in a downwardly extending rearward portion 51 of the lower slide and telescoping with a hollow shaft 52 fastened to a shaft 53 through the front of the carriage.

There is a splined connection between the shaft 50 and the hollow shaft 52 in which it telescopes so that there is freedom of longitudinal motion but no freedom of rotation between these shafts.

This arrangement permits lateral sliding of the lower slide 45 without interfering with screw adjustment by a wheel 54 upon the outer end of the shaft 53, of the position of the upper slide with respect to the lower slide.

Normally a usual lateral feed will be applied to ratchet teeth 55 upon this feed wheel for automatic truing of the grinding wheel against a diamond between grindings.

The specific means for accomplishing this feed for truing against a diamond is not shown as it does not form in itself a part of the present invention which is directed rather toward any relative onsetting between the wheel and work to the line of grinding after the wheel has entered the work and to the two-slide feature of the carriage which adapts the carriage to adjustably onsetting the wheel without interfering with adjustably controlling the position of its longitudinal line of motion or with its lateral feed to a truing diamond.

In Figure 7 the carriage carries an upwardly extending lug 56 to which the rocker arm 57 is pivoted at 58. The roller 25 is carried upon the lower end of the rocker arm 57 to engage the offset $30^4$ upon the stationary cam $27^4$. This stationary cam is fastened rigidly to the bed. The upper end 59 of the rocker arm engages a shoulder 60 of the lower slide. A spring 61 is stretched between anchors 62 and 63 respectively fastened to the carriage lug 56 and to the side of the lower slide and resiliently pulls the lower slide toward engagement with the upper end 59 of the rocker arm.

The motion of the lower slide to the right in response to the pull of the spring may, as in Figure 1, be stopped by engagement between the roller and the rearward portion 28 of the stationary cam, but I prefer to make the distance of setover adjustable and in Figure 7 I stop the slide by engagement between the head 64 of a bolt 65 adjustably threaded laterally into the side of the lower slide and an upward projection 66 from the carriage through which it loosely passes.

The distance of motion to the right of the lower slide in response to pull of the spring 61 is thus adjustably limited by engagement between the head of the bolt and the upward projection 66 on the carriage.

In this arrangement the roller 25 at the lower end of the rocker arm 57 need not engage the rearward portion 28 of the cam at all but after rolling over the onsetting or offsetting portion $30^4$ maintains continual engagement with the forward portion 31 of the cam, maintaining the lower slide sufficiently far from the axis of rotation of the workhead to bring the edge of the grinding wheel into the line of finished grinding.

In Figure 8 the upper slide and the adjustment between it and the next slide have been omitted. They are shown in Figure 7. The spring 61' is a compression spring pushing the lower slide toward its position for grinding.

Until the wheel has entered the proper distance into the sleeve the roller 25 mounted upon the downwardly projecting portion 51' of the lower slide will engage the rearward portion 28 (Figure 7) of the cam which is fastened to the stationary bed.

The roller then passes over the onsetting or offsetting portion $30^4$ of the cam (Figure 7) and the compression spring 61' (Figure 8) is free to push the lower slide into the proper alignment for finished grinding.

The stop of the lower slide at position for grinding alignment may be effected by engagement between the roller 25 and the forward portion 31 (Figure 7) of the cam, or may be adjustable as illustrated in Figure 8 by engagement between the face 67 of the slide and the end of a screw 65' adjustably threaded through an upper projection 66 from the carriage.

The line of finished grinding may be adjusted to any desired distance from the axis of rotation of the wheel head by adjustment of the hand wheel 54.

In normal operation the wheel 54 will only be used for an initial setting of the face of the wheel to the diamond which has first been set spaced slightly inwardly from the desired line of finished grinding an amount corresponding to the known onsetting movement of the wheel.

The extent of the onsetting movement may be adjusted if desired by changing the bolt 65 or 65'. The onsetting movement may be merely enough to avoid bell-mouthing, perhaps, one-hundredth of an inch, or may be made as much more as desirable.

In operation the truing diamond somewhat in front of the sleeve is set somewhat inwardly from the line of finished grinding, a distance inwardly equal to the onsetting movement of the carriage by careful adjustment either of the position of the diamond or of the degree of onsetting.

The carriage moves forward, the rapidly revolving wheel passes over the truing diamond and to some distance into the sleeve. The roller 25 comes to the offset of the stationary cam and the wheel moves laterally into the line of grinding, either positively under the push of the cam upon the roller as in Figures 1, 5, and 6 or resiliently under the action of the spring as in Figures 2 and 8.

The wheel now moves or traverses longitudinally backward and forward by means of any suitable mechanism which in itself forms no part of the present invention and which is, therefore, not shown.

This back and forth motion, each time with a slight overlap of the wheel at each end of the sleeve continues until the grinding is over.

The carriage then moves back and the wheel first moving radially inward before it leaves the sleeve passes longitudinally rearward toward the diamond.

While the carriage is back and the wheel out of the way the finished sleeve is removed and a new one put into the workhead after which the cycle repeats indefinitely.

In view of my invention and disclosure variations and modifications to meet individual whim or particular need and to obtain part or all of the benefit of my invention without copying the structure of the drawings, will doubtless become evident to others skilled in the art and I therefore claim all such in so far as they fall within the reasonable spirit and scope of my invention.

Having thus described my invention what I claim as new and desire to secure by Letters Patent is:—

1. The steps in the method of grinding duplicate internal surfaces of revolution in successive workpieces, using a grinding wheel and a truing diamond, which consist in rotating each workpiece, in setting the diamond in front of the workpiece with its point inwardly of the longitudinal line of intended initial cut, in moving the rotating wheel longitudinally forward across the diamond and to some distance within the work while maintaining the wheel out of contact with the work, in relatively onsetting the wheel and work and in longitudinally reciprocating the rotating wheel, bringing its grinding face into the line of finished grinding.

2. The steps in the method of grinding duplicate internal surfaces of revolution in successive workpieces, using a grinding wheel and a truing diamond, which consist in rotating each workpiece, in placing the diamond in front of the workpiece with its point spaced somewhat in-

BEST AVAILABLE COPY wardly from the line of finished grinding, in longitudinally moving the rotating wheel forwardly across the face of the diamond, in bringing the wheel into the workpiece, in onsetting the wheel against the workpiece, in traversing the wheel while maintaining its contact with the workpiece, in grinding until the cutting portion of the wheel is in the line of finished grinding, in offsetting the wheel, in longitudinally moving the wheel rearwardly toward the diamond while maintaining the wheel out of contact with the workpiece and in longitudinally moving the wheel for a truing cut across the diamond.

3. The steps in the method of grinding duplicate internal surfaces of revolution in successive workpieces, using a grinding wheel and a truing diamond, which consist in rotating each workpiece, in setting the diamond in front of the workpiece with its point spaced inwardly from the line of intended initial cut, in longitudinally moving the rotating wheel forwardly parallel to the axis of the workpiece across the diamond, in bringing the wheel into the workpiece while maintaining the wheel out of contact with the workpiece, in onsetting the wheel against the workpiece, in traversing the wheel while maintaining its contact with the workpiece, in grinding until the cutting portion of the wheel is in the line of finished grinding, in offsetting the wheel, in longitudinally moving the wheel rearwardly toward the diamond while maintaining the wheel out of contact with the workpiece, in truing the wheel by movement rearwardly parallel to the line of finished grinding across the diamond, in replacing the finished workpiece by another workpiece and in repeating the cycle over and over without moving the diamond.

4. In an automatic internal grinding machine operating upon work, a stationary bed, a carriage mounted to move longitudinally along the stationary bed, a first slide upon the carriage adapted to move transversely with respect to the carriage, a second slide mounted upon the first slide and adapted to move in the same direction as the first slide, a grinding wheel controlled by movement of either of the slides, automatic means for moving the first slide when the grinding wheel gains or loses contact with the work and means for relatively moving the second slide with respect to the first slide.

5. In an automatic internal grinding machine, a stationary bed, a work holder for holding and rotating worn during grinding, a carriage guided to move longitudinally along the bed, a first transverse slide upon the carriage, a second transverse slide upon the first transverse slide, a grinding wheel mounted on the slides and having its traverse position controlled by movement of either of the slides, cam means extending longitudinally of the bed and having a cam portion at a point corresponding to the position of contact between the grinding wheel and an end of the work for bringing the wheel into and out of contact with the work in a radial direction and means for relatively adjusting the first and second slides with respect to one another.

6. In an automatic internal grinding machine having step-over engagement of the grinding wheel and rotating work operated upon by the machine, a stationary bed, a carriage guided to move longitudinally along the bed, a transverse slide mounted upon the carriage and guided to move across the carriage, a second transverse slide mounted upon the first adapted to move longitudinally of the first, whereby movement of each of the slides affects the transverse position of the second slide, a gear adjustment of the relative positions of the slides, a wheel control mounted in the side of the carriage, a telescoping connection between the gearing and wheel control permitting adjustment by the wheel of the relative positions of the slides, and means controlled by the position of the carriage on the bed operative to automatically shift the position of the lower slide upon the carriage respectively radially outwardly and radially inwardly with respect to the work while the outside face of the wheel is axially overlapping the interior face of the work and the wheel is being carried respectively into and out of the work and whereby the wheel loses contact from the work after finish grinding by its lateral movement while the wheel is still partially within the work.

7. In an automatic grinding machine for internal grinding, a stationary bed, a workhead thereon adapted to rotate and to hold successive sleeves for internal grinding, a carriage on the bed adapted to advance and retract parallel to the axis of the workhead, a transverse slide on the carriage, a grinding wheel mounted on the slide adapted to rotate at high velocity and having a range of longitudinal traverse along the bore of a sleeve within the workhead when positioned by the advanced carriage within the bore of the sleeve with the wheel overlapping opposite ends of the bore at opposite ends of its range of traverse, cam connection between the slide and the stationary bed controlling the transverse position of the slide and therefore of the wheel by the longitudinal position of the carriage along the bed, said connection onsetting the wheel toward the interior surface of the sleeve when the advancing carriage positions the wheel within its said range of traverse and offsetting the wheel within its said range of traverse when the carriage is retracted from the workhead, and means for feeding the wheel into the work during its period of traverse within the bore of the sleeve.

8. In an automatic grinding machine for internal grinding, a stationary bed, a workhead thereon adapted to rotate and to hold successive sleeves for internal grinding, a carriage on the bed adapted to advance and retract parallel to the axis of the workhead, a transverse slide on the carriage, a grinding wheel mounted on the slide adapted to rotate at high velocity and having a range of longitudinal traverse along the bore of a sleeve within the workhead when positioned by the advanced carriage within the bore of the sleeve with the wheel overlapping opposite ends of the bore at opposite ends of its range of traverse, cam connection between the slide and the stationary bed controlling the transverse position of the slide and therefore of the wheel by the longitudinal position of the carriage along the bed, said connection onsetting the wheel toward the interior surface of the sleeve when the advancing carriage positions the wheel within its said range of traverse and offsetting the wheel within its said range of traverse when the carriage is retracted from the workhead, and means for feeding the wheel into the work during its period of traverse within the bore of the sleeve, said means including a mount carrying the wheel and feed mechanism for changing the position of the mount with respect to the slide in a direction transverse to the carriage.

9. In an internal grinding machine, a rotary workholding member and a rotary grinding member, a carriage for one of said members having longitudinal movements which procure disposal of the grinding member within and its withdrawal from the workpiece bore, and means responsive to such longitudinal movements for producing substantially radial onsetting and offsetting relative movements between said grinding member and the workpiece.

10. In an internal grinding machine, a rotary workholding member and a rotary grinding member, a carriage for one of said members movable in one direction to enter the grinding member in the workpiece bore, and in the other direction to space apart the grinding member and the workpiece, and means responsive to the first movement for radially onsetting said parts and responsive to the second movement for radially offsetting said parts.

11. In an internal grinding machine, a rotary workholding member and a rotary grinding member, a carriage for one of said members movable in one direction to enter the grinding member in the workpiece bore, and in the other direction to space apart the grinding member and the workpiece, means responsive to the first movement for radially onsetting said parts and responsive to the second movement for radially offsetting said parts, and a diamond arranged for engagement with said grinding member substantially in the line of the latter's offset from the workpiece bore.

CLIFFORD T. RAULE.